UNITED STATES PATENT OFFICE.

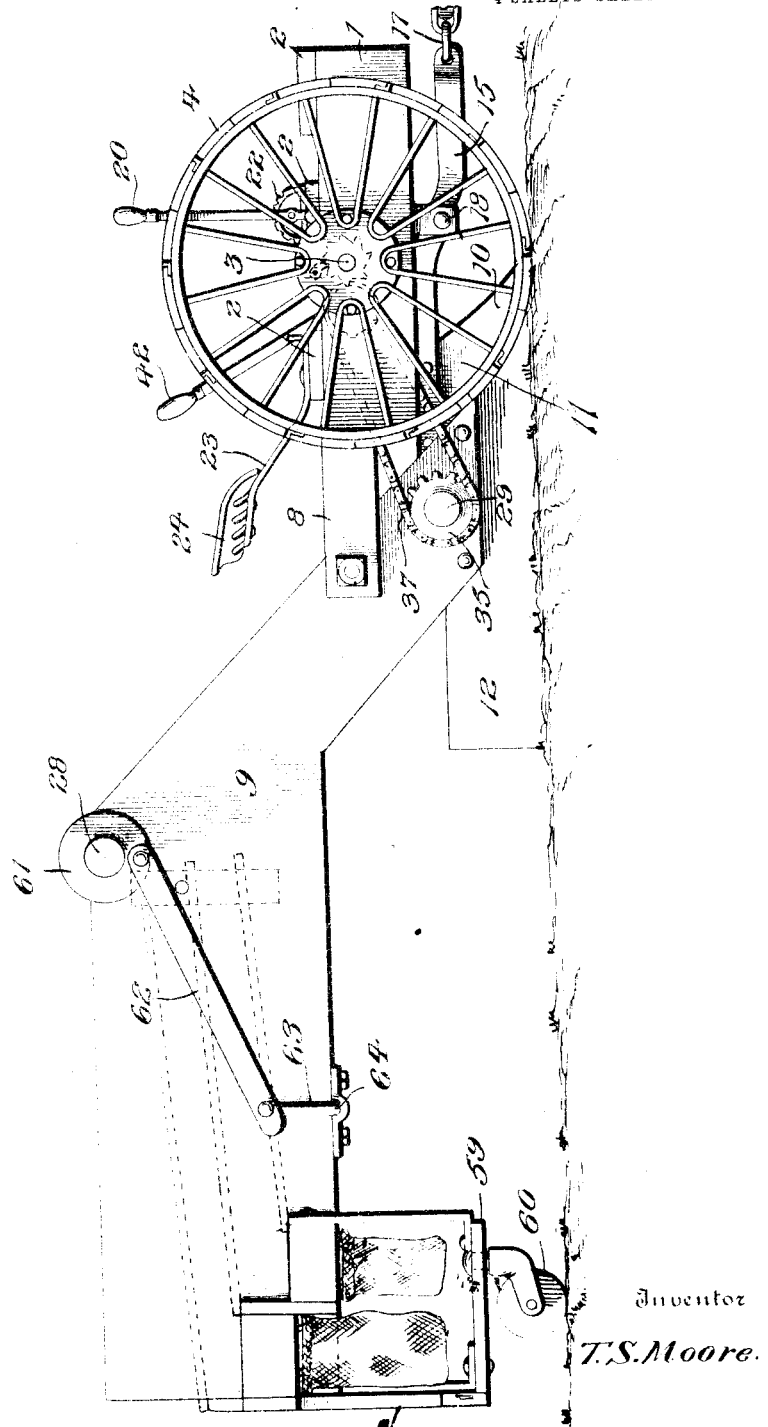

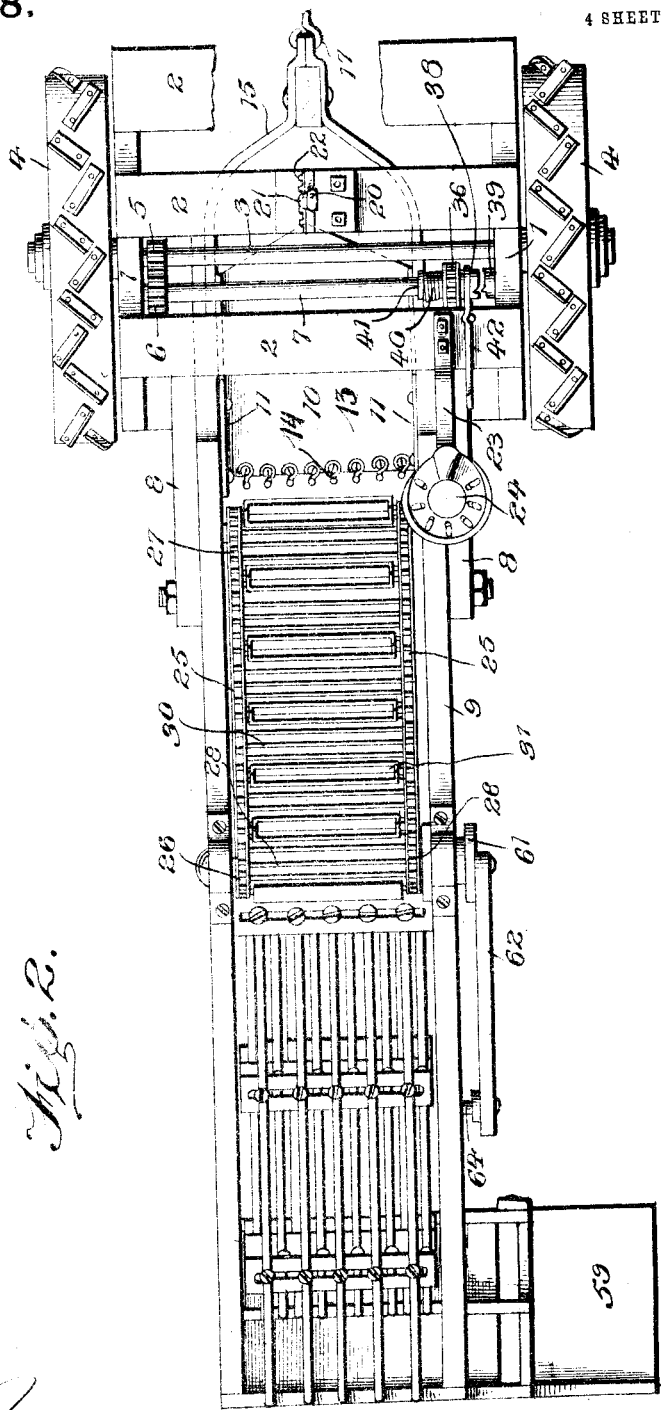

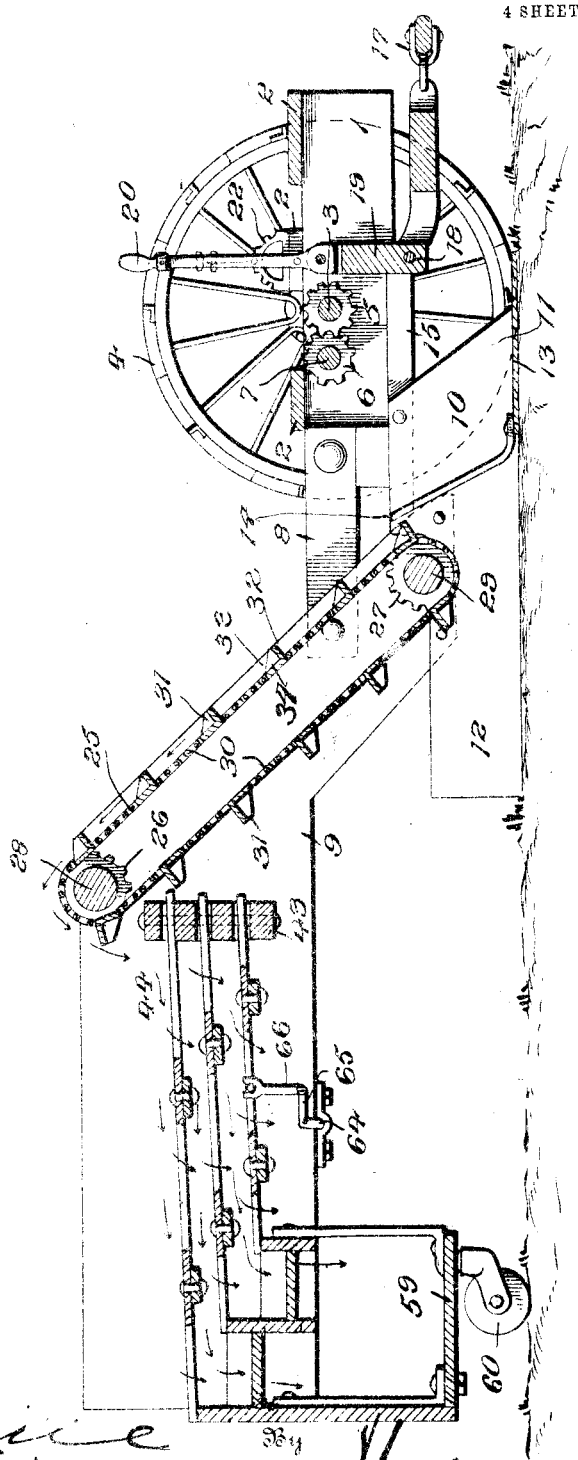

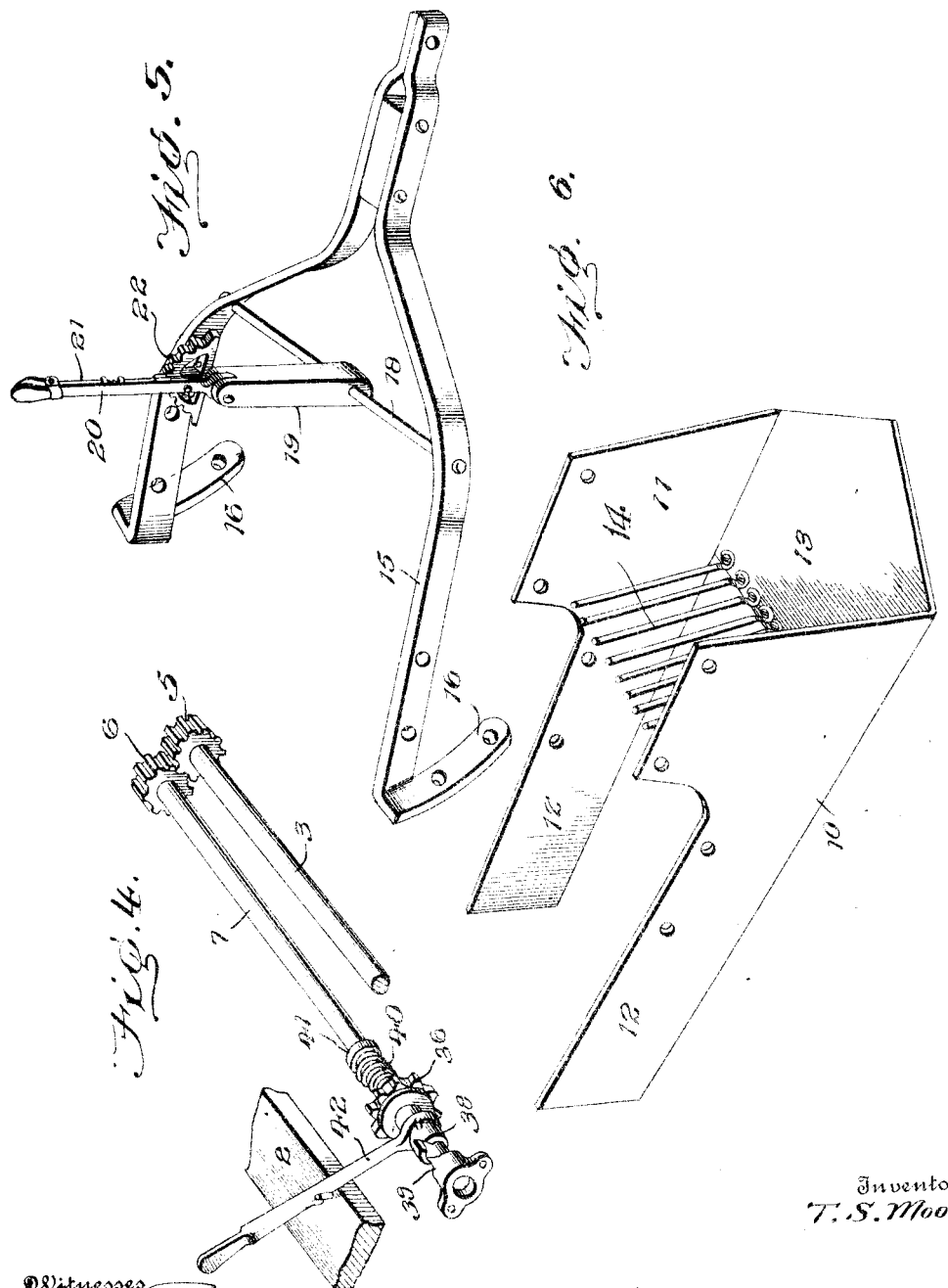

THOMAS S. MOORE, OF SHOSHONI, WYOMING.

POTATO-HARVESTER.

1,106,668.                Specification of Letters Patent.        Patented Aug. 11, 1914.

Application filed January 25, 1913.   Serial No. 744,195.

*To all whom it may concern:*

Be it known that I, THOMAS S. MOORE, a citizen of the United States, residing at Shoshoni, in the county of Fremont and State of Wyoming, have invented certain new and useful Improvements in Potato-Harvesters, of which the following is a specification.

This invention relates to machines for gathering potatoes, and has for its object the provision of an apparatus which may be drawn over a field and during its travel uproot the potatoes, separate the same from the vines and trash, and deliver them to convenient receptacles after being assorted according to their sizes.

The invention also has for its object the provision of novel means for conveying the potatoes from the scoop to the separator or screen.

The invention also seeks to improve, generally, the construction and arrangement of the parts of a potato harvester to the end that the durability and efficiency of the same may be increased.

All these stated objects and such other incidental objects which will appear as the description of the invention proceeds, are attained in mechanism of the character illustrated in the accompanying drawings, and the invention resides in certain novel features which will be particularly pointed out in the claims following the description.

In the annexed drawings: Figure 1 is a side elevation of an apparatus embodying my present invention; Fig. 2 is a plan view of the same; Fig. 3 is a central longitudinal section; Fig. 4 is a detail perspective view of a portion of the driving gearing; Fig. 5 is a detail perspective view of the hounds or draft applying device; Fig. 6 is a perspective view of the shovel or scoop.

In carrying out my invention, I employ a frame consisting of side bars 1 and cross bars or beams 2 connecting the same, an axle 3 being journaled in the side bars and traction wheels 4 being loosely mounted upon the ends of the axle. The traction wheels are connected with the axle through the usual escapement devices, so that, as the apparatus is drawn forward, motion will be imparted to the axle by the traction wheels, but backward movement of the traction wheels will permit the axle to remain stationary. This arrangement, furthermore, compensates for the difference in speed between the two traction wheels when the apparatus is being carried around a corner or turn, as will be readily understood. The axle is equipped with a pinion 5 near one end which meshes with a similar pinion 6 on a transverse shaft 7 which is journaled in the side bars 1 in rear of the axle. The rotation of the axle is imparted directly to this shaft and through suitable mechanism to be hereinafter described to the several operating parts. To the rear ends of the side bars 1, I pivotally secure the links or connecting bars 8, and the rear ends of these links or connecting bars are pivoted to the sides of a frame 9 which houses the elevator and the screens.

The scoop or shovel 10 is constructed with side plates 11 having rearwardly extending wings 12, and the said side plates are secured at their rear corners to the lower front corners of the frame 9, the wings 12 being extended rearwardly between the lower ends of the said frame 9 and being secured thereto so as to aid in supporting the said frame, as will be readily understood. These wings, furthermore, act as runners and take into the soil in rear of the shovel so as to hold the shovel or scoop to its work and prevent the same moving laterally with respect to the row of potatoes being taken up.

The shovel or scoop comprises a base plate or share 13 having a sharpened forwardly projecting edge adapted to take into the ground below the potatoes and extending between the side plates 11, as clearly shown in Fig. 6. From the rear edge of the base plate 13, a back 14 consisting of parallel longitudinal rods, projects upwardly at a slight inclination, so that, as the apparatus is drawn along the row of plants, the potatoes will be directed upwardly and rearwardly and pass from the upper edge of the back plate, falling therefrom onto the elevator and conveyer to be presently more particularly referred to while the loose dirt, roots and vines may fall between the bars to the ground.

The hounds 15 are provided with downturned arms or brackets 16 at their rear ends which are rigidly secured to the forward edges of the frame 9 at the lower front corners thereof whereby the draft will be applied directly to the said frame. The hounds are also rigidly secured to the upper portions of the side plates 11 of the scoop, and the front ends of the hounds converge and are united in front of the scoop, as shown in Figs. 2 and 5, the front extremities of the hounds being equipped with a clevis or other device, indicated at 11, whereby draft animals may be hitched to the apparatus. Between their front and rear ends, the hounds are connected by a cross bar 18 to which is pivoted a link 19, and to the upper end of this link is pivoted the lower end of a lever 20 which is fulcrumed upon the intermediate cross bar 2 of the main frame and is equipped with a latch 21 engaging a segment 22 whereby the lever may be held in any set position. It will be readily understood that by adjusting the lever the hounds will be raised or lowered and, consequently, the scoop or shovel will be permitted to take into the ground to any desired depth or may be lifted free of the ground so that the frame will be supported upon the traction wheels and may be drawn over the field without operating. This arrangement will be advantageous in hauling the machine over a road or when moving it into a barn or from a barn to a point of operation. The pivotal connection through the links 8 between the main frame and the supplemental frame 9 will permit the supplemental frame to readily accommodate itself to the movement of the shovel or scoop as the same is adjusted, so that the main frame will maintain its horizontal position under all conditions. Upon the rear cross bar 2 of the main frame is secured a seat standard 23 having a driver's seat 24 upon its upper end from which the operating lever 20 may be easily reached.

Within the forward portion of the frame 9 is mounted an elevator and conveyer consisting of endless chains 25 passing over sprocket wheels 26 and 27 fixed upon the upper and lower shafts or rollers 28 and 29, respectively, journaled in and extending between the side bars of the frame 9, transverse rods 30 being secured to and extending between the chains 25 so that the loose dirt deposited upon the conveyer will be permitted to drop through the same to the ground. A series of transverse buckets or carriers 31 are secured to the chains 25 and these buckets consist of back-plates 32 which are secured to the links of the chains, end-plates 33, and shelves or bottoms 34, the shelves or bottoms 34 being disposed at right angles to the respective back-plates 32 and the end-plates 33 closing the angles between the shelves and the backs. By referring to Fig. 3, it will be noted that the clearance between the back 14 of the scoop and the lower portion of the elevator and conveyer is just sufficient to permit the carriers to pass between these two elements so that the potatoes flowing over the upper edge of the scoop will be caught by the buckets or carriers and carried along the upper run of the conveyer.

The lower shaft or roller 29 is extended laterally beyond one end of the conveyer frame and is equipped thereat with a sprocket wheel 35 around which and a sprocket wheel 36 is trained a sprocket chain 37. The sprocket wheel 36 is loosely mounted upon the shaft 7 and is constructed with an elongated hub having notches 38 in its outer end whereby it forms a clutch member adapted to engage a clutch member 39 rigid with the said shaft 7, as will be readily understood, the sprocket wheel and its hub being normally pressed toward the clutch member 39 by a spring 40 coiled around the shaft 7 between the sprocket wheel and a fixed stop 41 on the shaft, as will be readily understood. The clutch hub is engaged by the lower front end of a lever 42 which is fulcrumed upon the main frame adjacent the seat standard 23 so that, when it is desired to stop the operation of the conveyer and the parts acting therewith, the driver by moving the upper free end of this lever laterally may move the sprocket wheel 36 inwardly away from the clutch member 39 whereupon the shaft 7 will rotate freely without imparting motion to the sprocket wheel. Upon releasing the lever 42, the spring 40 will at once expand and throw the clutch members into engagement.

Within the frame 9 in rear of the elevating conveyer and below the upper roller 28 supporting the same, I pivotally mount a head block or support 43 to which are secured the front ends of the separators 44, three of these separators or screens being illustrated in the present embodiment of the invention.

A platform 59 is supported in any convenient manner from the rear end of the supplemental frame 9 so that an operator may stand thereon and remove filled sacks and supply empty sacks as the machine travels over the field without any necessity of stopping the operation. Caster wheels 60 are mounted in any convenient manner in the platform and travel on the ground below the said platform so as to support the rear end of the apparatus and move freely laterally as the machine is carried around corners or is brought into position to make a return trip across the field.

The upper shaft or roller 28 by which the elevating conveyer is supported is extended beyond one side of the supplemental frame and is equipped at its extended end with a crank disk 61 to which is pivoted the upper forward end of a connecting bar 62. The lower rear end of this connecting bar is pivoted to a crank arm 63 provided on the end of a rock shaft 64 journaled in the sides of the rear frame and extending across the machine. Between the sides of the supplemental or rear frame 9, the rock shaft 64 is formed or provided with crank arms 65 and lifter arms 66 rise therefrom to engage the lowermost screen of the separator. So that a vibratory movement will be imparted to the separator and the material deposited thereon will be agitated and the elements of the same separated. As the head block 43 is pivotally mounted within the supplemental frame 9, the vibration of the lowermost screen will be imparted to the said head and through the same to the upper screens.

It is thought the operation of my improved apparatus will be readily understood from the foregoing description, taken in connection with the accompanying drawings.

The shovel or scoop having been properly adjusted to take into the ground to the desired depth, the apparatus is drawn over the field along a row of plants so that the blade or base of the shovel will pass below the potatoes and scoop up the same, as will be readily understood. The dirt, vines, roots and other matter thus taken up will be caused to travel upwardly over the back of the scoop in a continuous stream and the greater portion of the dirt will escape through the back of the scoop. The potatoes will be taken up by the buckets or carriers and will be conveyed to the upper turn of the conveyer and there discharged onto the separator. The loss of potatoes by the dropping of the same through the conveyer is prevented by the transverse rods 30, as before stated and as will be readily understood, so that all the potatoes will be deposited upon the uppermost screen of the separator, the loose dirt dropping to the ground between the rods 30. Motion is imparted to the conveyer through the sprocket wheels 36 and 35 and the chain 37 connecting the same so that as long as the machine is traveling and the spring 40 is not compressed, the elevator will operate. It will also be noted that the interposition of the transmission shaft 7 reverses the direction of rotation so that the lower roller or shaft of the conveyer will rotate in a direction opposite to the direction of rotation of the axle and, consequently, the carriers upon the upper run of the conveyer will travel upwardly. As the conveyer is continuously operating the crank disk 61 will, of course, rotate with the shaft 28 and the connecting bar 62 will, consequently, be caused to vibrate the crank arm 63. The rock shaft 64 will, consequently, be oscillated so that the arm 65 and the lifting arms 66 rising therefrom will be alternately raised and lowered and a lifting and dropping movement, consequently, imparted to the separator or gang of screens. The sticks, portions of vines, leaves and trash gathered up with the potatoes and deposited upon the separator will be caught by the uppermost screen, while the potatoes will be permitted to drop through the same onto the intermediate screen. The vibration imparted to the separator will agitate the potatoes so that the dirt and vines will be shaken therefrom and will drop between the bars of the screens onto the ground, while the potatoes will be directed into the discharge spouts.

It will readily be seen that I have provided an apparatus which will operate automatically as it is drawn over a field to uproot the potatoes, deliver them onto a separator, then assort the potatoes, while separating them from the vines and other trash, and deliver the assorted potatoes into suitable receptacles.

By my apparatus the smaller potatoes which are valuable principally for seed and for feeding live stock are separated from the larger more marketable potatoes and it is, therefore, possible to obtain a higher price for the product.

What I claim is:—

1. An apparatus for the purpose set forth comprising a wheeled frame, a supplemental frame arranged in rear of the wheeled frame, pivotal connections between the two frames, a scoop secured to the supplemental frame, a conveyer carried by the supplemental frame in rear of the scoop and adjacent the same, means upon the wheeled frame for actuating the conveyer, and means mounted upon the wheeled frame for adjustably supporting the scoop.

2. The combination of a wheel-supported frame, a supplemental frame pivotally connected therewith, a scoop secured to the said supplemental frame and disposed below the wheeled frame, draft devices connected with the scoop, means for raising and lowering said draft devices and the scoop, a conveyer mounted within the supplemental frame, a sprocket wheel connected with said conveyer, a pinion on the axle of the wheeled frame, a transmission shaft disposed on said frame parallel with the axle, a pinion on said shaft meshing with the pinion on the axle, a sprocket wheel loosely mounted on the transmission shaft, a chain trained around said sprocket wheel and the first-mentioned sprocket wheel, means for holding the sprocket wheel on the transmission shaft normally locked to said shaft, and means for releasing said sprocket wheel.

3. The combination of a main frame, supporting means therefor, a supplemental frame connected with the main frame in rear thereof, a scoop secured to the said supplemental frame and having rearwardly extending wings secured to the forward end of the supplemental frame and extending rearwardly beyond the same, a conveyer mounted within the supplemental frame, and means upon the main frame for actuating said conveyer.

4. The combination of a wheeled frame, a supplemental frame in rear of the wheeled frame and connected therewith, a scoop secured to the supplemental frame, a conveyer mounted in the supplemental frame, and means on the wheeled frame to operate the conveyer.

5. The combination of a wheeled frame, a supplemental frame in rear of the wheeled frame and connected therewith, a scoop secured to the supplemental frame, a conveyer mounted in the supplemental frame, means on the wheeled frame to operate the conveyer, and a separator arranged in rear of the conveyer and operatively connected therewith.

6. The combination of a frame, a supplemental frame in rear of and connected with the first-mentioned frame supporting wheels therefor, a scoop connected to the supplemental frame, a separator arranged within the supplemental frame in rear of the scoop, and operative connections between said separator and said supporting wheels.

7. The combination of a wheel-supported frame, a supplemental frame connected therewith, a scoop secured to the said supplemental frame and disposed below the wheeled frame, means for raising and lowering the scoop, a conveyer mounted within the supplemental frame, a sprocket wheel connected with said conveyer, a pinion on the axle of the wheeled frame, a transmission shaft disposed on said frame parallel with the axle, a pinion on said shaft meshing with the pinion on the axle, a sprocket wheel loosely mounted on the transmission shaft, a chain trained around said sprocket wheel and the first-mentioned sprocket wheel, means for holding the sprocket wheel on the transmission shaft normally locked to said shaft, and means for releasing said sprocket wheel.

In testimony whereof I affix my signature in presence of two witnesses.

THOMAS S. MOORE. [L. S.]

Witnesses:
ANTHONY HANSON.
CHARLES T. COLE.